United States Patent
Kozaki

(10) Patent No.: US 9,871,942 B2
(45) Date of Patent: Jan. 16, 2018

(54) WEB CONTENT DISPLAY SYSTEM, IMAGE FORMING APPARATUS, WEB PAGE PROVIDING METHOD, AND COMPUTER PROGRAM

(71) Applicant: Konica Minolta, Inc., Chiyoda-ku, Tokyo (JP)

(72) Inventor: Yousuke Kozaki, Itami (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/281,791

(22) Filed: Sep. 30, 2016

(65) Prior Publication Data
US 2017/0099409 A1    Apr. 6, 2017

(30) Foreign Application Priority Data
Oct. 2, 2015    (JP) ................. 2015-196860

(51) Int. Cl.
*H04N 1/32* (2006.01)
*H04N 1/00* (2006.01)
*H04L 29/08* (2006.01)
*H04L 29/06* (2006.01)

(52) U.S. Cl.
CPC ..... *H04N 1/32122* (2013.01); *H04N 1/00307* (2013.01); *H04N 1/00344* (2013.01); *H04N 1/00464* (2013.01); *H04L 67/02* (2013.01); *H04L 67/42* (2013.01); *H04N 2201/0094* (2013.01)

(58) Field of Classification Search
CPC .................................................. H04N 1/32122
See application file for complete search history.

(56) References Cited

U.S. PATENT DOCUMENTS

| | | | |
|---|---|---|---|
| 2006/0123266 A1* | 6/2006 | Matsumoto | G06Q 20/10 714/1 |
| 2008/0150952 A1 | 6/2008 | Koarai | |
| 2011/0210972 A1* | 9/2011 | Tsirkin | G06F 3/14 345/428 |

(Continued)

FOREIGN PATENT DOCUMENTS

| | | |
|---|---|---|
| JP | 2008-139981 A | 6/2008 |
| JP | 2009-238232 A | 10/2009 |

*Primary Examiner* — Ibrahim Siddo
(74) *Attorney, Agent, or Firm* — Buchanan Ingersoll & Rooney PC

(57) ABSTRACT

An image forming apparatus that is remotely accessed from a terminal apparatus includes: a display; a display control unit configured to control display of the display and to transmit image data of an image to the terminal apparatus in order to display the image to be displayed on the display, onto the terminal apparatus; an attribute information acquisition unit configured to obtain first attribute information related to an attribute of the terminal apparatus; a web content acquisition unit configured to obtain web content by issuing a notification of second attribute information related to an attribute of the image forming apparatus to a server in a case where remote access is not being executed, and by issuing a notification of the first attribute information to the server in a case where remote access is being executed; and a browser unit configured to generate an image based on the obtained web content.

17 Claims, 14 Drawing Sheets

(56) References Cited

U.S. PATENT DOCUMENTS

2012/0008160 A1* 1/2012 Matsushita ........... G06F 3/1206
                                                    358/1.14
2012/0327443 A1* 12/2012 Fujii ................. H04N 1/00222
                                                    358/1.13

* cited by examiner

FIG. 9

| CLOUD STORAGE | | | |
|---|---|---|---|
| MY DRIVE ▶ | | | 🔍 |
| NEW | | | |

- 📁 MY DRIVE
- ⤷ NEWLY-ARRIVED ITEM
- 🕐 RECENTLY-USED ITEM
- ★ WITH STAR
- 🗑 TRASH BOX

| NAME | | OWNER | LAST UPDATED |
|---|---|---|---|
| 📁 | 1-5 ★ | MYSELF | 2011/09/08 |
| 📁 | root | MYSELF | 2013/08/20 |
| 📁 | odd | MYSELF | 2011/09/08 |
| 📁 | prime number | MYSELF | 2013/07/16 |
| 📁 | 2-2_old | MYSELF | 2013/07/16 |
| 📁 | 2-2 ★ | MYSELF | 2013/08/20 |
| 📄 | ABCD_06.pdf | MYSELF | 2011/09/08 |
| 📄 | EFGH_08.pdf | MYSELF | 2011/09/08 |
| 📄 | convert.jpg | MYSELF | 2013/12/02 |
| 📄 | convert.jpg | MYSELF | 2013/07/07 |
| 📄 | KMMJ | MYSELF | 2011/12/25 |

62

WEB CONTENT DISPLAY SYSTEM, IMAGE FORMING APPARATUS, WEB PAGE PROVIDING METHOD, AND COMPUTER PROGRAM

The entire disclosure of Japanese Patent Application No. 2015-196860 filed on Oct. 2, 2015 including description, claims, drawings, and abstract are incorporated herein by reference in its entirety.

BACKGROUND OF THE INVENTION

Field of the Invention

The present invention relates to a technique of providing web content to a terminal apparatus executing remote access to an image forming apparatus.

Description of the Related Art

An image forming apparatus having integrated functions of a copier, a network printer, a fax machine, a scanner, a file server, or the like, is widely available. This type of image forming apparatus is referred to as a "combined machine" or a "multi-function peripheral (MFP)".

A display of an image forming apparatus in recent years has increased its size and resolution. In addition, there has emerged an image forming apparatus equipped with a web browser.

Along with this trend, there is a proposed technique of providing, as a server-side support, dynamic web content linked with a function or state unique to the image forming apparatus (JP 2009-238232 A). Furthermore, there is also a proposed technique of providing data by converting the web content into data that can be displayed on an operation panel (JP 2008-139981 A).

Using a miniaturized mobile-type terminal apparatus such as a smartphone, it is possible to execute remote access to an image forming apparatus and to remotely operate the image forming apparatus.

Using a remote access technique, it is possible to use, from the terminal apparatus, a web browser on the image forming apparatus.

Unfortunately, in a case where the web browser from the image forming apparatus is used on the terminal apparatus with conventional methods, it is not always possible to comfortably view the web content such as an obtained web page.

SUMMARY OF THE INVENTION

The present invention has been made in view of this issue, and an object thereof is to provide a function to display web content more suitably than before in a case where a user browses the web content by executing remote access from a terminal apparatus having a miniaturized display, such as a smartphone, to an image forming apparatus.

To achieve the abovementioned object, according to an aspect, an image forming apparatus that can be remotely accessed from a terminal apparatus reflecting one aspect of the present invention comprises: a display; a display control unit configured to control display of the display and to transmit image data of an image to the terminal apparatus in order to display the image to be displayed on the display, onto the terminal apparatus; an attribute information acquisition unit configured to obtain first attribute information related to an attribute of the terminal apparatus; a web content acquisition unit configured to obtain web content by issuing a notification of second attribute information related to an attribute of the image forming apparatus to a server in a case where remote access is not being executed from the terminal apparatus, and by issuing a notification of the first attribute information to the server in a case where remote access is being executed from the terminal apparatus; and a browser unit configured to generate an image based on the obtained web content, wherein the display control unit displays, on the display, an image based on the web content that corresponds to the second attribute information, generated by the browser unit, in a case where remote access is not being executed from the terminal apparatus, and transmits, to the terminal apparatus, the image data of an image based on the web content that corresponds to the first attribute information, generated by the browser unit, in a case where remote access is being executed from the terminal apparatus.

To achieve the abovementioned object, according to an aspect, a web content display system reflecting one aspect of the present invention comprises: the above image forming apparatus; and a server configured to provide web content to the image forming apparatus, wherein the server includes a web content transmission unit configured to transmit, to the image forming apparatus, web content that corresponds to one of the first attribute information and the second attribute information, notified from the image forming apparatus, as the web content.

To achieve the abovementioned object, according to an aspect, an image forming apparatus that can be remotely accessed from a terminal apparatus reflecting one aspect of the present invention comprises: a display; a display control unit configured to control display of the display and to transmit image data of an image to the terminal apparatus in order to display the image to be displayed on the display, onto the terminal apparatus; an attribute information acquisition unit configured to obtain first attribute information related to an attribute of the terminal apparatus; a web content acquisition unit configured to obtain web content from a server by issuing a notification of second attribute information related to an attribute of the image forming apparatus to a server; and a browser unit configured to generate an image based on the obtained web content, wherein the display control unit displays, on the display, the image based on the web content that corresponds to the second attribute information, generated by the browser unit, in a case where remote access is not being executed from the terminal apparatus, and transmits, to the terminal apparatus, the image data of the obtained web content that have been adjusted on a basis of the first attribute information, in a case where remote access is being executed from the terminal apparatus.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 9 is a diagram illustrating an exemplary large-sized web page;

DESCRIPTION OF THE PREFERRED EMBODIMENTS

Hereinafter, an embodiment of the present invention will be described with reference to the drawings. However, the scope of the invention is not limited to the illustrated examples.

Figure 1:
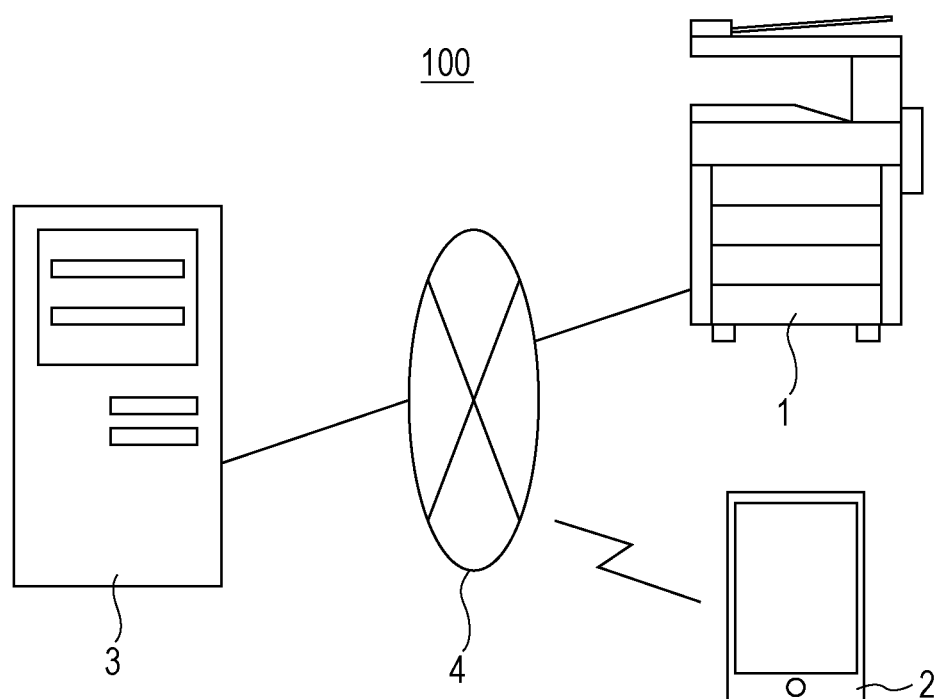
FIG. 1 is a diagram illustrating an exemplary overall configuration of a web page browsing system.
Figure 2:
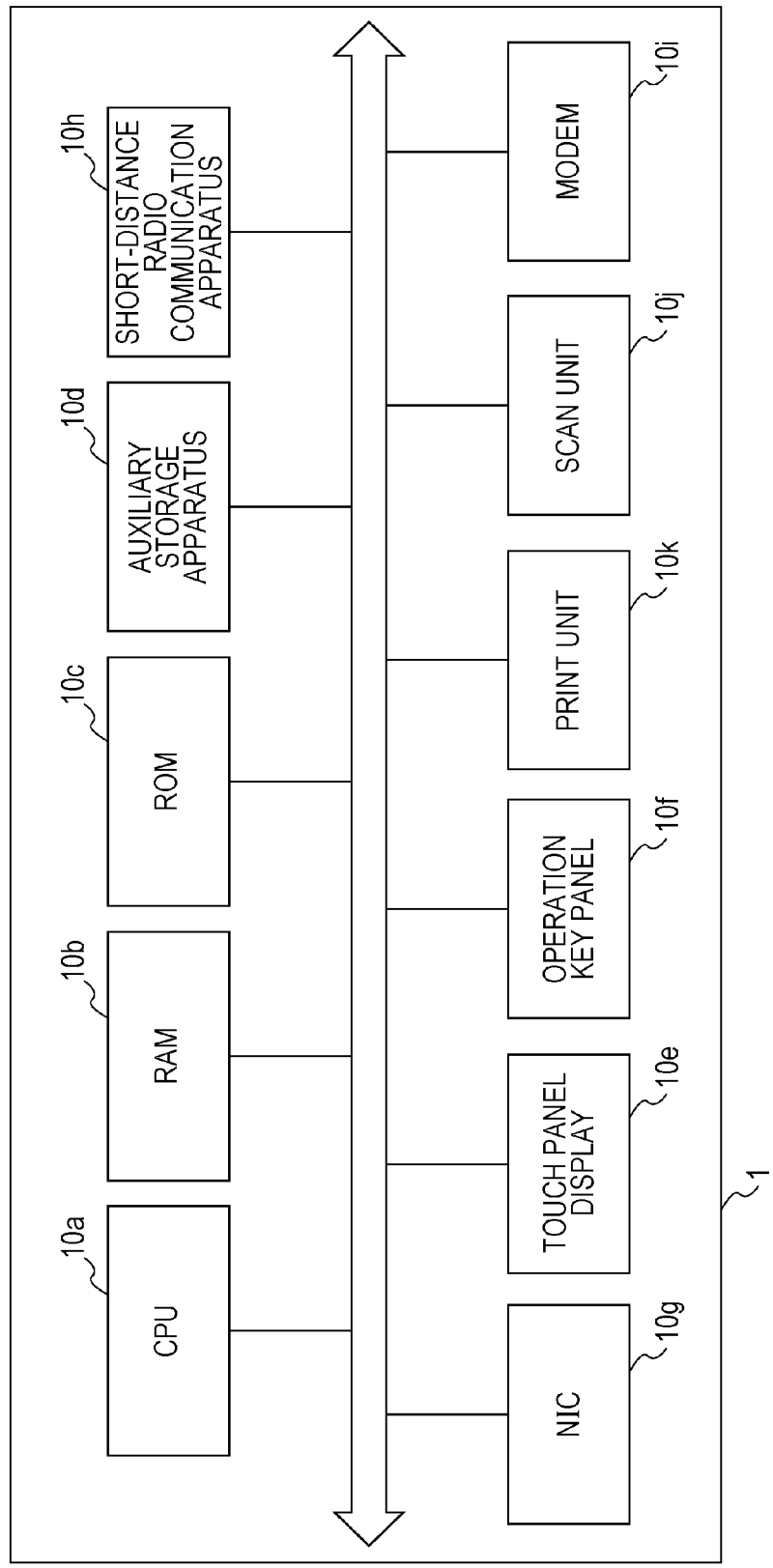
FIG. 2 is a diagram illustrating an exemplary hardware configuration of an image forming apparatus.
Figure 3:
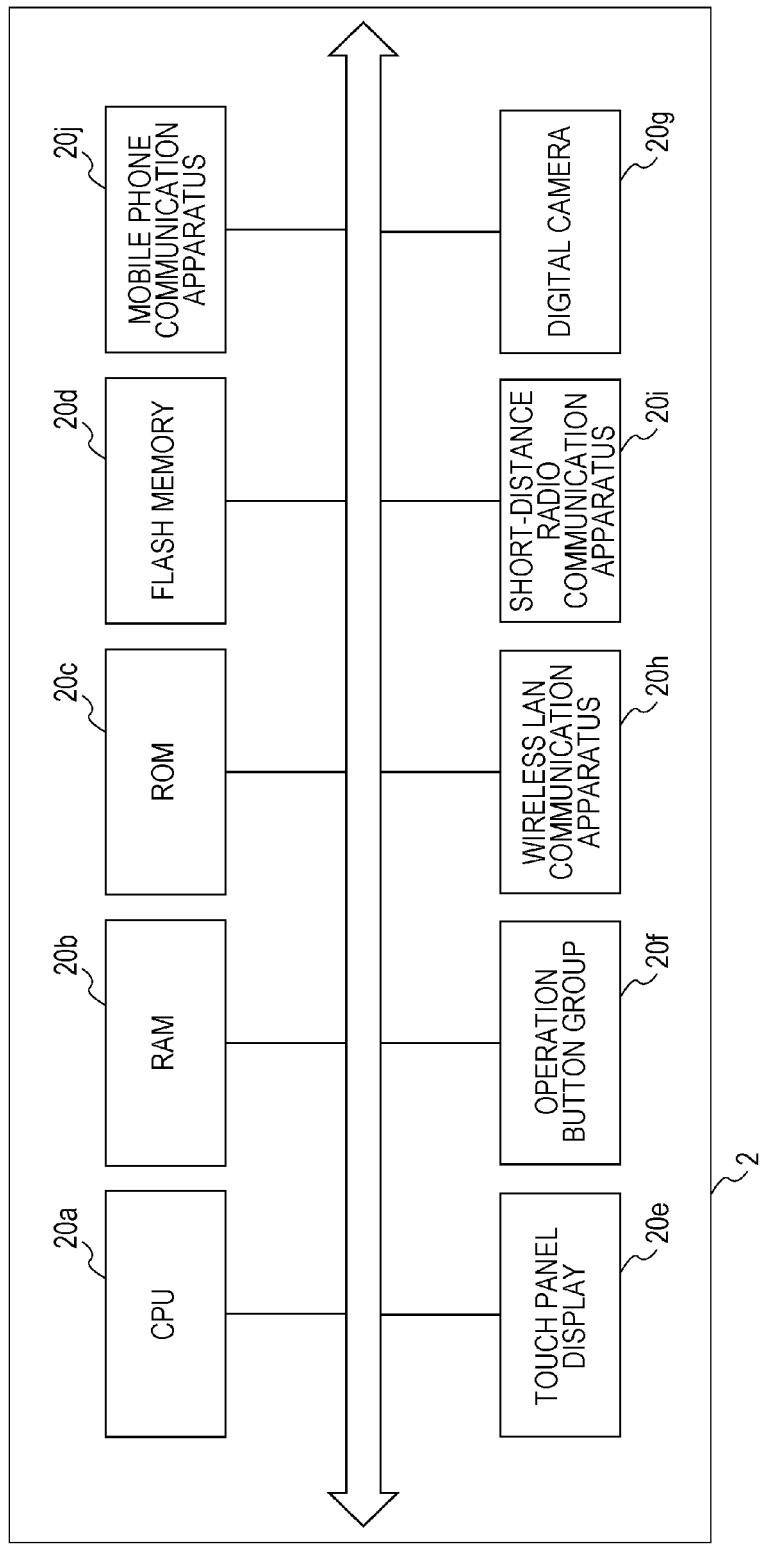
FIG. 3 is a diagram illustrating an exemplary hardware configuration of a terminal apparatus.
Figure 4:
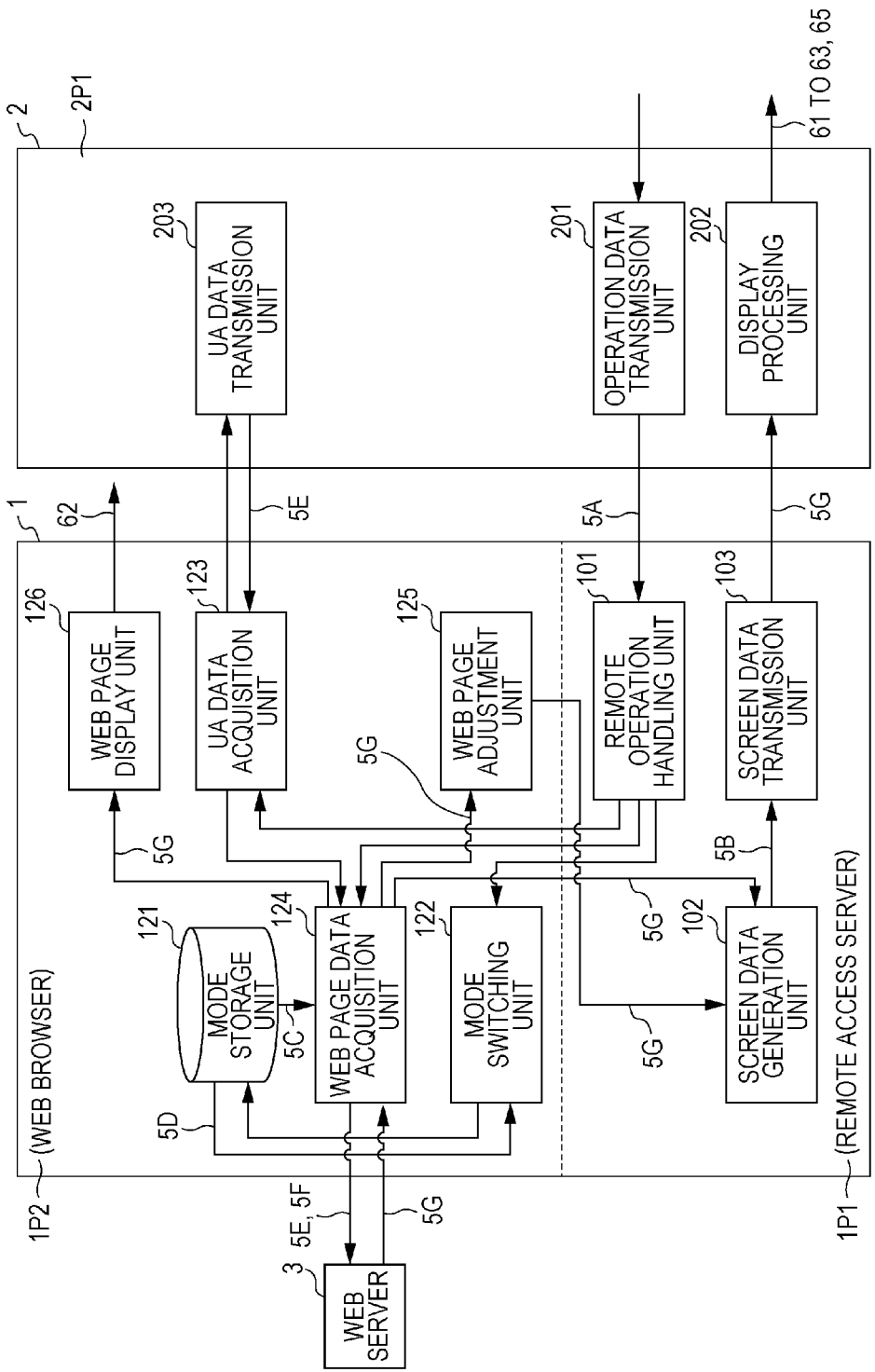
FIG. 4 is a diagram illustrating exemplary functional configurations of an image forming apparatus and a terminal apparatus.

FIG. 1 is a diagram illustrating an exemplary overall configuration of a web page browsing system 100. FIG. 2 is a diagram illustrating an exemplary hardware configuration of an image forming apparatus 1. FIG. 3 is a diagram illustrating an exemplary hardware configuration of a terminal apparatus 2. FIG. 4 is a diagram illustrating exemplary functional configurations of the image forming apparatus 1 and the terminal apparatus 2.

As illustrated in FIG. 1, the web page browsing system 100 includes the image forming apparatus 1, the terminal apparatus 2, a web server 3, and a communication line 4.

The image forming apparatus 1, the terminal apparatus 2, and the web server 3 can communicate with each other via a communication line 4. The Internet, a local area network (LAN) line, a fixed telephone line, a mobile telephone line, or the like, is used as the communication line 4.

The image forming apparatus 1 is an apparatus having integrated function of a copier, a network printer, a fax machine, a scanner, a file server, or the like. This apparatus is also referred to as a "combined machine" or a "multifunction peripheral (MFP)".

As illustrated in FIG. 2, the image forming apparatus 1 includes a central processing unit (CPU) 10a, a random access memory (RAM) 10b, a read only memory (ROM) 10c, an auxiliary storage apparatus 10d, a touch panel display 10e, an operation key panel 10f, a network interface card (NIC) 10g, a short-distance radio communication apparatus 10h, a modem 10i, a scan unit 10j, and a print unit 10k.

The touch panel display 10e displays a screen indicating a message for a user, a screen for inputting a command or information by the user, a screen indicating a result of processing executed by the CPU 10a, or the like. The touch panel display 10e also transmits a signal indicating a touched position, to the CPU 10a. Hereinafter, the touch panel display 10e will be described with an exemplary case of using a touch panel display having resolution of 800×480 pixels.

By causing the terminal apparatus 2 to remotely access the image forming apparatus 1, the user can remotely operate the image forming apparatus 1 using the terminal apparatus 2 instead of the touch panel display 10e.

The operation key panel 10f represents a hardware keyboard, and includes a ten-key pad, a start key, a stop key, and function keys.

The NIC 10g communicates with the terminal apparatus 2 or the web server 3 using a protocol such as transmission control protocol/internet protocol (TCP/IP).

The short-distance radio communication apparatus 10h performs communication using radio waves having a travel range from several to a dozen meters. An apparatus conforming to a standard that is Bluetooth (registered trademark), a universal serial bus (USB), or the like, is used as the short-distance radio communication apparatus 10h.

The modem 10i transmits/receives image data to/from a facsimile terminal, using a protocol such as G3.

The scan unit 10j reads an image on a sheet set on a platen glass base and generates image data.

The print unit 10k prints, on a sheet, an image read by the scan unit 10j and other image received from the terminal apparatus 2, the web server 3, or the like, via the NIC 10g, the short-distance radio communication apparatus 10h, or the modem 10i.

The ROM 10c or the auxiliary storage apparatus 10d stores a program for enabling the above-described functions such as copying, and a server program 1P1 for accepting remote access from the terminal apparatus 2. Moreover, a web browser program 1P2 is stored as a program for enabling the web browser.

These programs are loaded onto the RAM 10b and executed by the CPU 10a, as required. A hard disk, a solid state drive (SSD), or the like, is used as the auxiliary storage apparatus 10d.

The terminal apparatus 2 is a client for remotely using the above-described functions of the image forming apparatus 1. As the terminal apparatus 2, a personal computer, a smartphone, a tablet computer, a mobile telephone terminal, or the like, is used. Hereinafter, the terminal apparatus 2 will be described with an exemplary case of using a smartphone as the terminal apparatus 2.

As illustrated in FIG. 3, the terminal apparatus 2 includes a CPU 20a, a RAM 20b, a ROM 20c, a flash memory 20d, a touch panel display 20e, an operation button group 20f, a digital camera 20g, a wireless LAN communication apparatus 20h, a short-distance radio communication apparatus 20i, a mobile telephone communication apparatus 20j, or the like.

The touch panel display 20e displays a screen indicating a message for a user, a screen for inputting a command or information by the user, a screen indicating a result of processing executed by the CPU 20a. During remote access to the image forming apparatus 1, the touch panel display 20e displays a screen that should be displayed on the touch panel display 10e of the image forming apparatus 1. The touch panel display 20e also transmits a signal indicating a touched position, to the CPU 20a. Hereinafter, the touch panel display 20e will be described with an exemplary case of using a touch panel display having resolution of 480×320 pixels.

The operation button group 20f includes a button to return to a home screen, a button to verify something, a button to adjust sound volume, a button to switch power on/off. The digital camera 20g captures various images.

The wireless LAN communication apparatus 20h performs communication with the image forming apparatus 1 using a protocol such as TCP/IP via a base station that constitutes the communication line 4.

The short-distance radio communication apparatus 20i performs short-distance radio communication on a basis of a standard same as the standard of the short-distance radio communication apparatus 10h of the image forming apparatus 1. The mobile telephone communication apparatus 20j performs communication via a mobile telephone network.

The ROM 20c or the flash memory 20d stores a driver and an application program enabling the use of the above-described functions of the image forming apparatus 1. In addition, a client program 2P1 is stored as a program for executing remote access to the image forming apparatus 1.

These programs are loaded onto the RAM 20b and executed by the CPU 20a, as required.

The web server 3 provides a web page to a client, namely, the image forming apparatus 1, the terminal apparatus 2, or the like. In some cases, the web server 3 transmits one or more prepared files to the client. In other cases, the web server 3 generates a web page using a common gateway interface (CGI), or the like, according to the data given by the client and transmits a generated web page file to the client. These files are typically described with a hypertext markup language (HTML), JavaScript (registered trademark), or the like. An image file with an image format of the graphics interchange format (GIF), the joint photographic experts group (JPEG), or the like, is transmitted as an image file to form a web page.

The web server 3 provides a web page according to an attribute of the client, as a web page corresponding to one uniform resource locator (URL).

For example, in a case where display resolution is predetermined resolution or above, the web server 3 provides a web page designed for a personal computer or a tablet computer. In a case where display resolution is below the predetermined resolution, the web server 3 provides a web page designed for a smartphone. This mechanism is well known.

With the server program 1P1, the web browser program 1P2, and the client program 2P1, the user can browse a web page suitable for the terminal apparatus 2 instead of the image forming apparatus 1 even in a case where the user executes remote access from the terminal apparatus 2 to the image forming apparatus 1 and browse the web page. Hereinafter, this mechanism will be described with reference to FIG. 4, or the like.

With the server program 1P1, functions of a remote operation handling unit 101, a screen data generation unit 102, a screen data transmission unit 103, or the like, illustrated in FIG. 4, are enabled on the image forming apparatus 1.

With the web browser program 1P2, the functions including a mode storage unit 121, a mode switching unit 122, a user agent data acquisition unit 123, a web page data acquisition unit 124, a web page adjustment unit 125, a web page display unit 126, or the like, illustrated in FIG. 4, are enabled on the image forming apparatus 1.

With the client program 2P1, functions of an operation data transmission unit 201, a display processing unit 202, a user agent data transmission unit 203, or the like, illustrated in FIG. 4, are enabled on the terminal apparatus 2.

In addition to these, the server program 1P1 and the client program 2P1 enables functions for connecting the image forming apparatus 1 with the terminal apparatus 2 to execute remote access from the terminal apparatus 2 to the image forming apparatus 1.

[Outline of Individual Portions]

After the image forming apparatus 1 and the terminal apparatus 2 are connected with each other for remote access, the operation data transmission unit 201 of the terminal apparatus 2 transmits operation data 5A indicating operation details to the image forming apparatus 1 each time the user performs operation on the terminal apparatus 2 until specific operation (for example, input of a remote access finish command) is performed.

When the operation data 5A are transmitted from the terminal apparatus 2, the remote operation handling unit 101 of the image forming apparatus 1 handles user operation of the terminal apparatus 2 on a basis of the operation data 5A.

The screen data generation unit 102 generation data 5B used to display a screen to be displayed on the touch panel display 10e, on the terminal apparatus 2.

The screen data transmission unit 103 transmits the screen data 5B to the terminal apparatus 2 each time the screen data 5B are generated by the screen data generation unit 102.

The display processing unit 202 of the terminal apparatus 2 displays a screen on the touch panel display 20e on a basis of the screen data 5B each time the screen data 5B is transmitted from the image forming apparatus 1.

The mode storage unit 121 stores current mode data 5C. The current mode data 5C indicates a current mode related to displaying of a web page. Prepared modes related to displaying of the web page include three modes, namely, a "normal mode", a "remote access mode" and an "adjustment mode". The default mode is a normal mode.

The normal mode is a mode of obtaining a web page suitable for the touch panel display 10e and displaying the web page. The remote access mode is a mode of obtaining a web page suitable for the display of the apparatus that has remotely accessed to the image forming apparatus 1 and displaying the obtained web page. The adjustment mode is a mode of obtaining a web page suitable for the touch panel display 10e, adjusting the web page in accordance with a display of another apparatus (for example, terminal apparatus 2) that has remotely accessed the image forming apparatus 1, and displaying the adjusted web page.

In addition, the mode storage unit 121 stores default mode data 5D. The default mode data 5D represents a default mode to be applied at the time when the image forming apparatus 1 is remotely accessed. As a default mode, any one of the remote access mode and the adjustment mode is preset by the user.

The mode switching unit 122 switches the mode by updating the current mode data 5C stored in the mode storage unit 121.

The user agent data acquisition unit 123 obtains user agent data 5E indicating a user agent (UA) of the terminal apparatus 2.

The user agent data transmission unit 203 of the terminal apparatus 2 transmits the user agent data 5E to the image forming apparatus 1. Details of the user agent data 5E will be described below.

The web page data acquisition unit 124 of the image forming apparatus 1 obtains a file of a user-specified web page or a homepage (web page set to be displayed immediately after start of web browser) from the web server 3.

The web page adjustment unit 125 adjusts, as required, a configuration of a web page for which the file has been obtained by the web page data acquisition unit 124.

The web page display unit 126 displays a web page on the touch panel display 10*e* in a case where remote access is not being executed.

[Exemplary Processing on Individual Portions at Remote Access]

Figure 5:
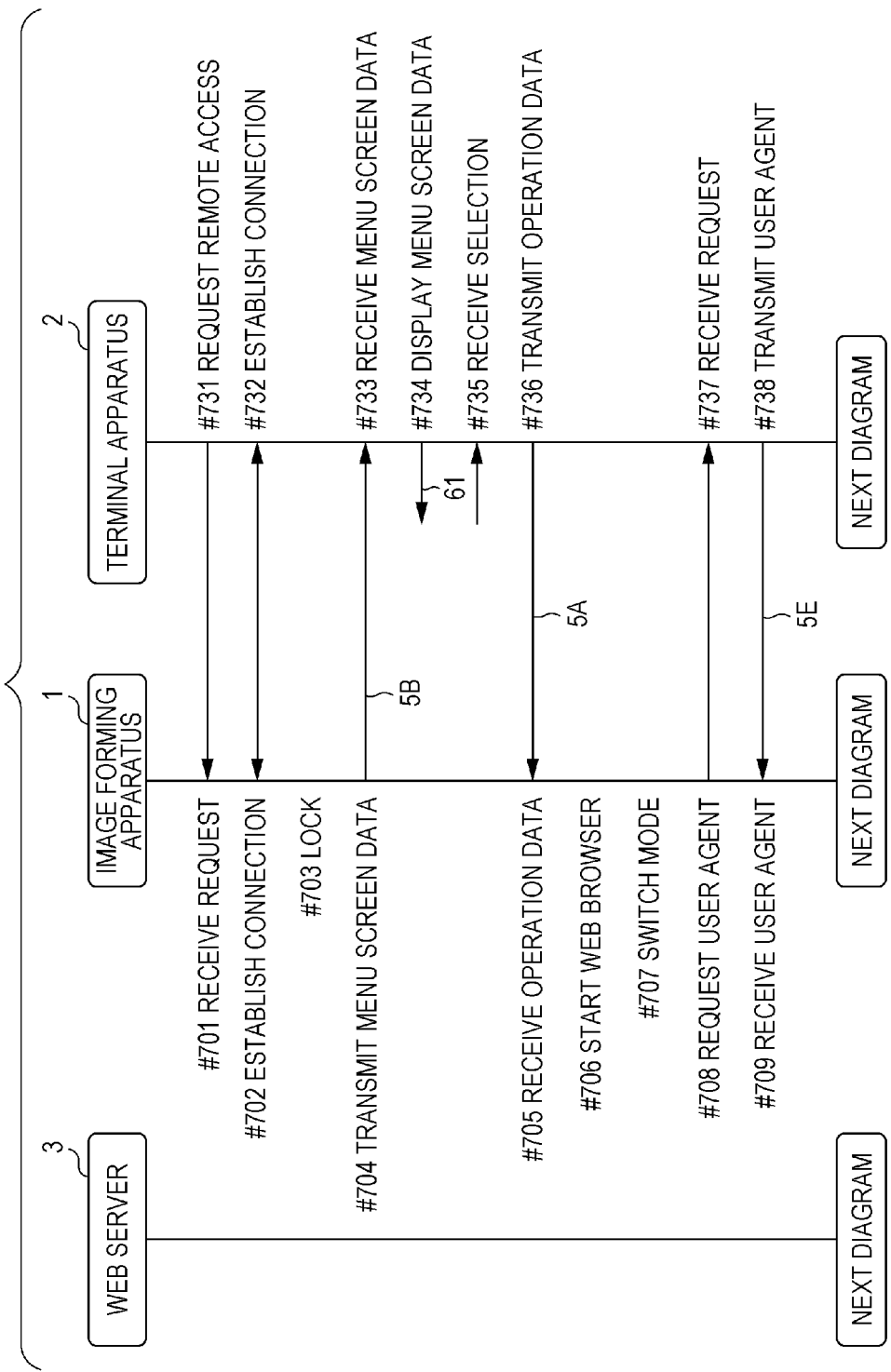
FIG. 5 is a sequence diagram illustrating an exemplary processing flow of an image forming apparatus, a terminal apparatus, and a web server, at the time of remote access.
Figure 6:
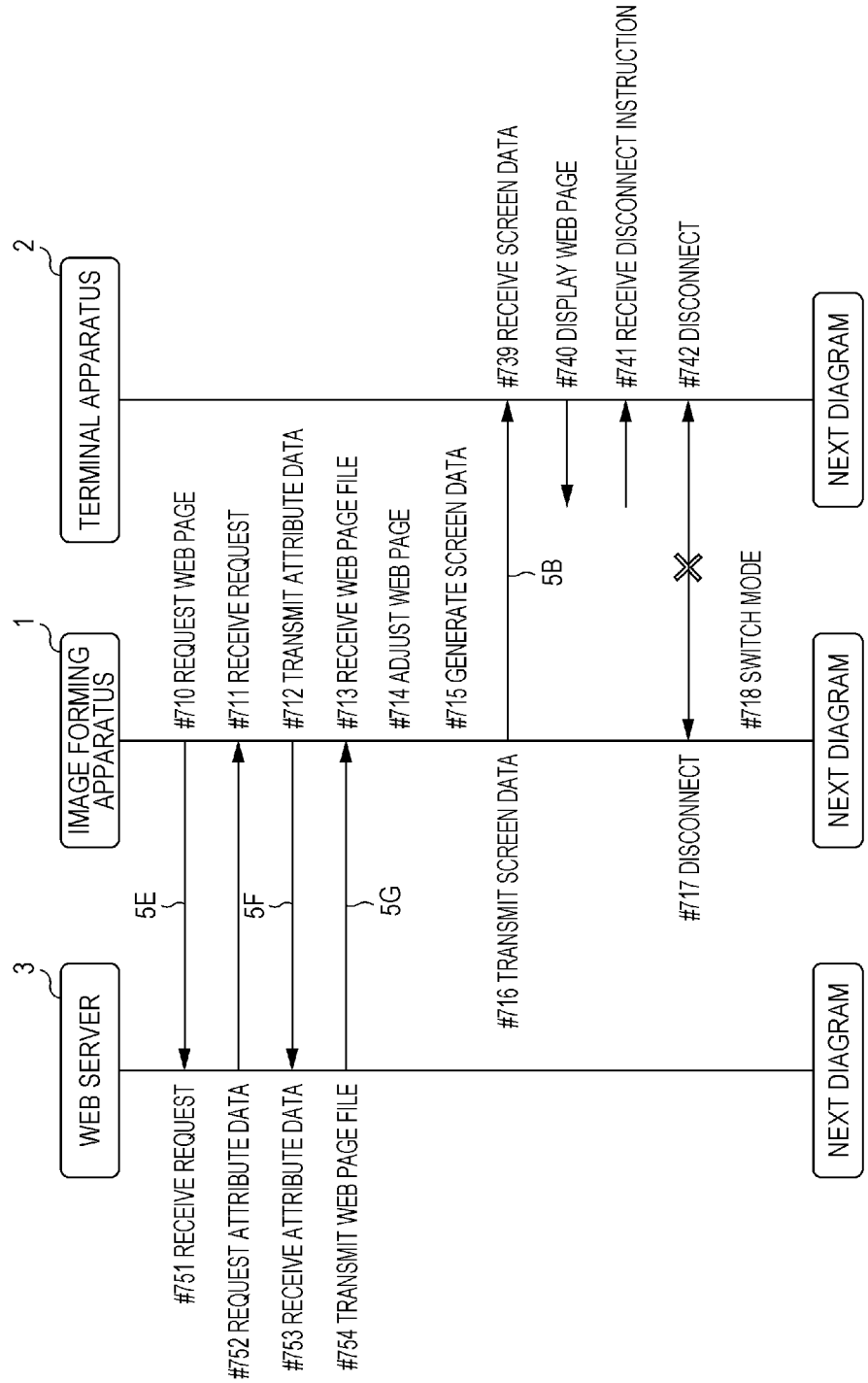
FIG. 6 is a sequence diagram illustrating an exemplary processing flow of an image forming apparatus, a terminal apparatus, and a web server, at the time of remote access.
Figure 7:
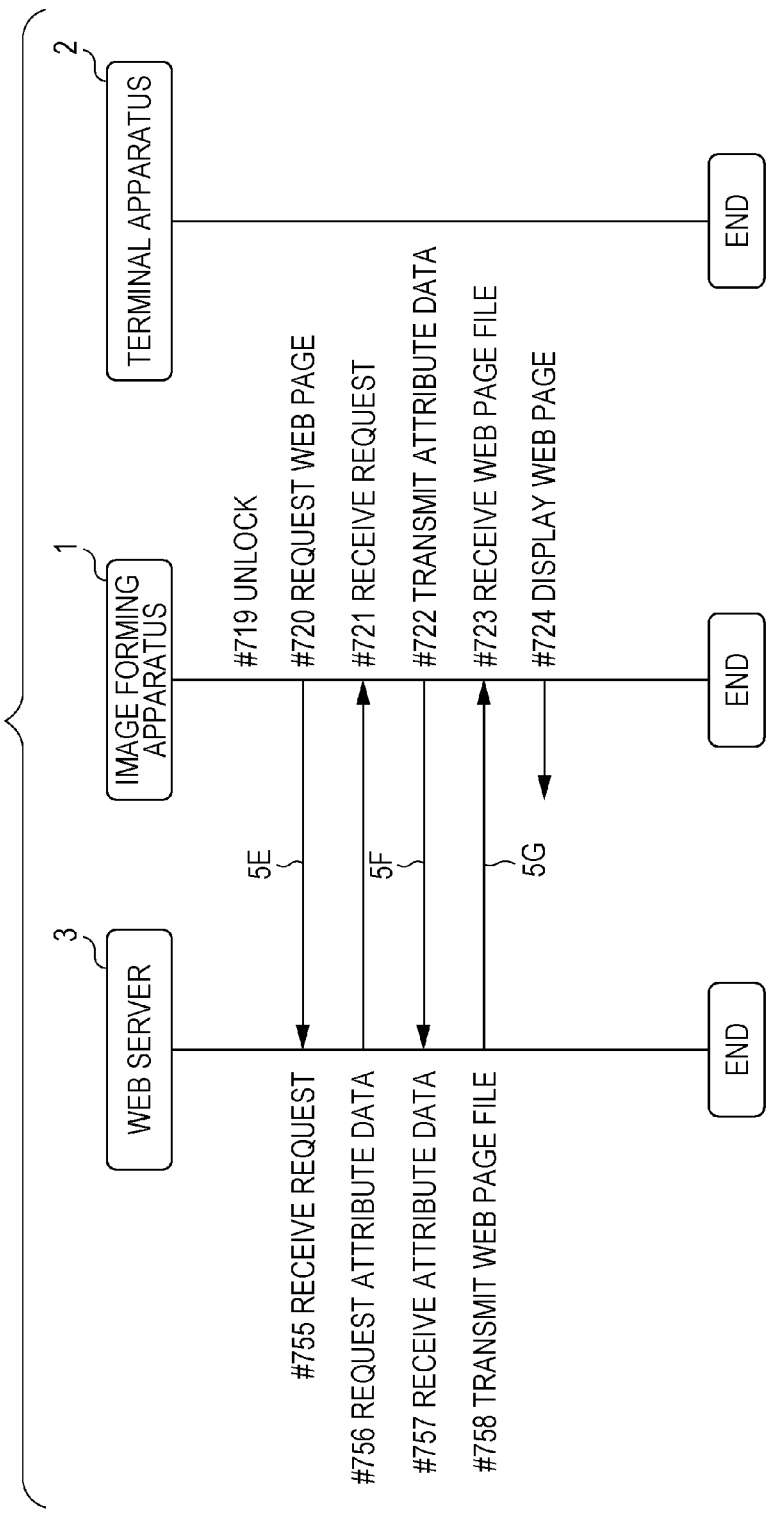
FIG. 7 is a sequence diagram illustrating an exemplary processing flow of an image forming apparatus, a terminal apparatus, and a web server, at the time of remote access.
Figure 8:
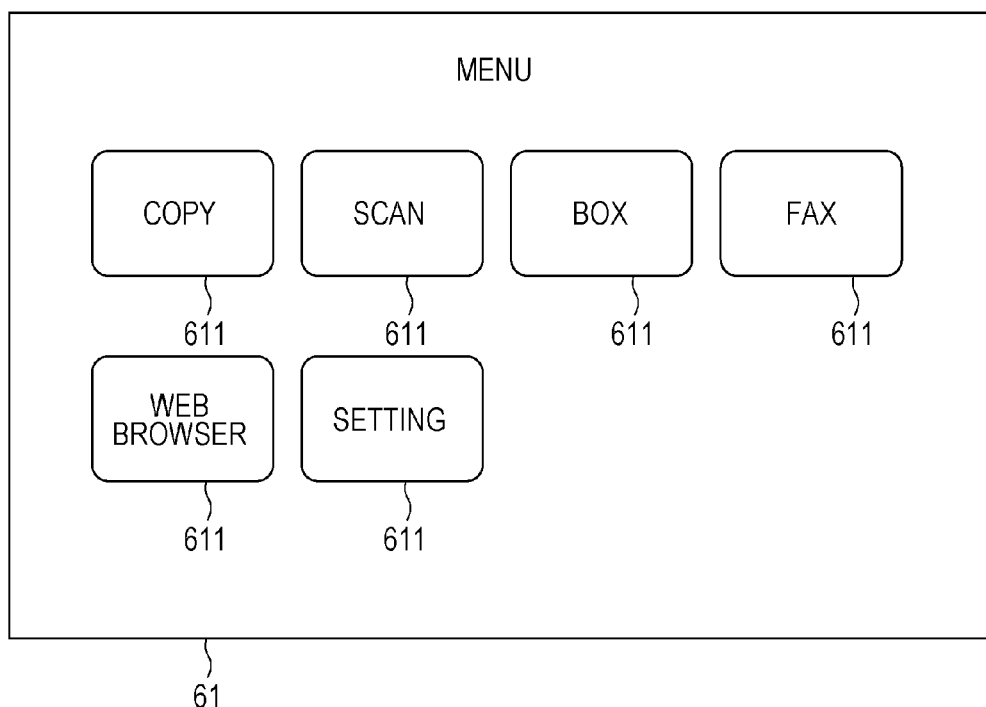
FIG. 8 is a diagram illustrating an exemplary menu screen.
Figure 10:
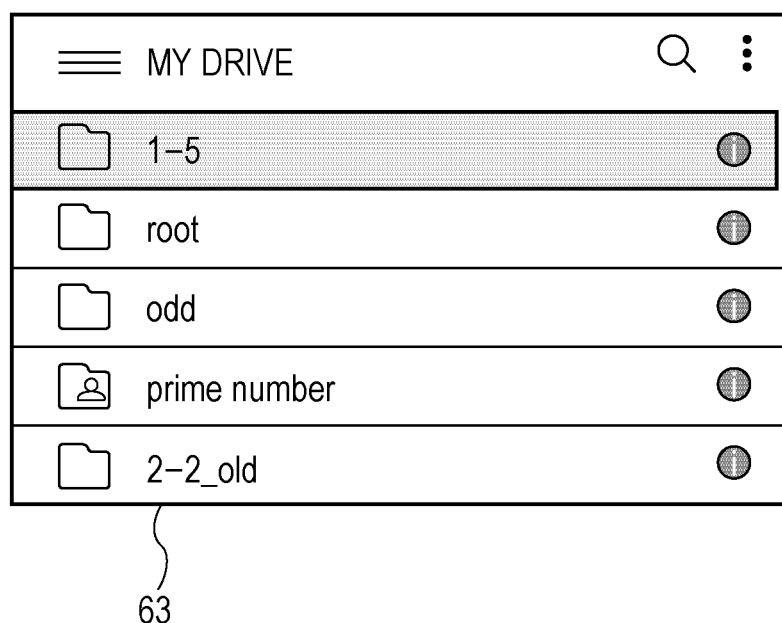
FIG. 10 is a diagram illustrating an exemplary small-sized web page.
Figure 11A:
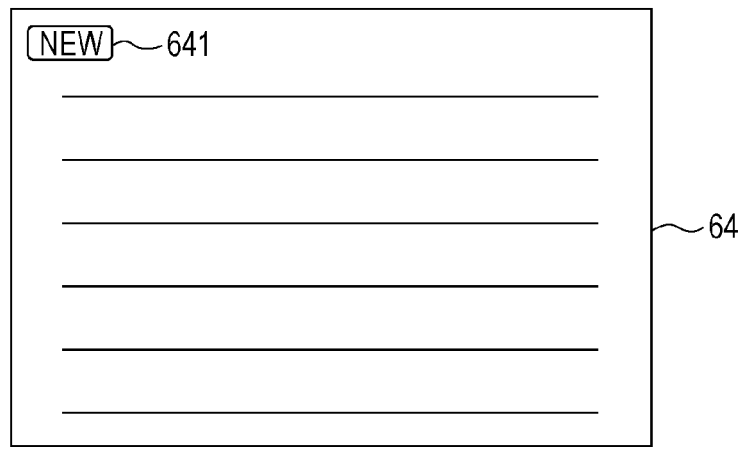
FIGS. 11A to 11C are diagrams for illustrating exemplary web page adjustment processing.
Figure 11B:
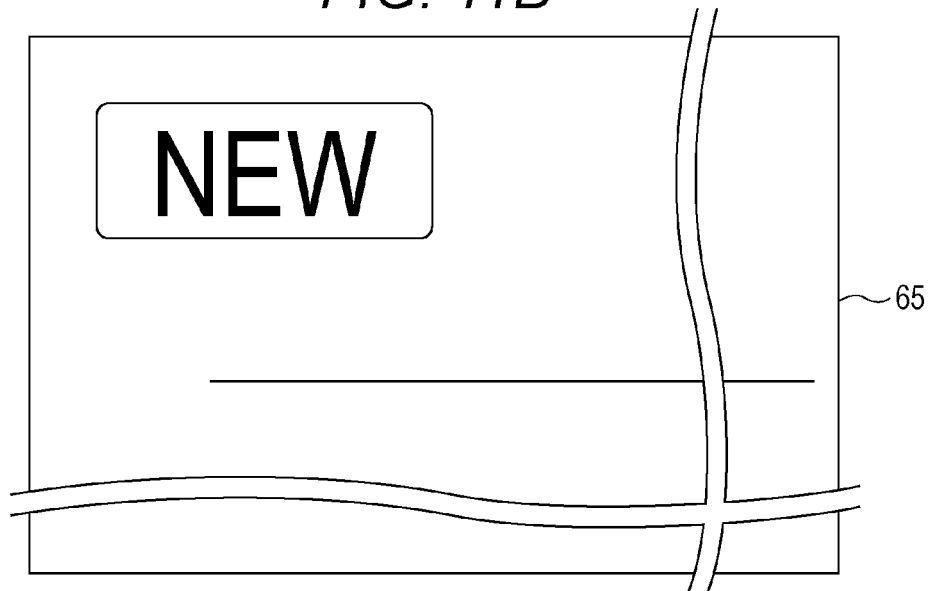
Figure 11C:

FIGS. 5 to 7 are sequence diagrams illustrating exemplary flows of processing of the image forming apparatus 1, the terminal apparatus 2, and the web server 3, at remote access. FIG. 8 is a diagram illustrating an exemplary menu screen 61. FIG. 9 is a diagram illustrating an exemplary large-sized web page 62. FIG. 10 is a diagram illustrating an exemplary small-sized web page 63. FIGS. 11A to 11C are diagrams for illustrating exemplary web page adjustment processing.

Next, processing on individual portions in FIG. 4 will be described more specifically with an exemplary case where the terminal apparatus 2 remotely accesses the image forming apparatus 1 and uses the web browser of the image forming apparatus 1.

A user starts the client program 2P1 on the terminal apparatus 2 in advance. Subsequently, the user inputs an identifier (for example, IP address) of the image forming apparatus 1 and a remote access command.

In response to this, a remote access request is issued from the terminal apparatus 2 to the image forming apparatus 1 (#731 and #701 in FIG. 5), and thus, the image forming apparatus 1 and the terminal apparatus 2 establish (#702 and #732) connection (remote connection) with each other in a known method.

Once the connection is established, the touch panel display 10*e* is locked (#703) in parallel with remote operation of the image forming apparatus 1. With this mechanism, the touch panel display 10*e* stops receiving operation until it is unlocked.

The screen data generation unit 102 transmits, as screen data 5B, screen data for displaying a predetermined screen, to the terminal apparatus 2. In the present embodiment, the screen data of the menu screen 61 are transmitted (#704). As illustrated in FIG. 8, buttons 611 are arranged on the menu screen 61. The buttons 611 are used to select from the functions included in the image forming apparatus 1, such as copier, a fax machine, and a web browser.

On the terminal apparatus 2, the display processing unit 202 receives the screen data 5B (#733), and thereafter, displays the menu screen 61 on the touch panel display 20*e* (#734) on a basis of the screen data 5B. The user touches the button 611 that corresponds to the web browser.

In response to this, the operation data transmission unit 201 receives the operation details (#735), and transmits data indicating the operation to the image forming apparatus 1 (#736) as operation data 5A. In this case, data indicating the touch and the position of the touch are transmitted.

Upon receiving the operation data 5A (#705), the remote operation handling unit 101 on the image forming apparatus 1 handles user operation on a basis of the operation data 5A. In this case, the web browser program 1P2 is started (#706).

In a case where the web browser program 1P2 is started in response to the user operation on another apparatus (terminal apparatus 2 in the present embodiment) that is executing remote access, the mode switching unit 122 and the user agent data acquisition unit 123 execute the following processing.

The mode switching unit 122 switches a display mode to the mode displayed as the default mode data 5D (#707). Specifically, in a case where the remote access mode is displayed as the default mode data 5D, the current mode data 5C is updated to display the remote access mode. In a case where the adjustment mode is displayed, the current mode data 5C is updated to display the adjustment mode.

The user agent data acquisition unit 123 issues a request for the user agent data 5E to the terminal apparatus (#708), and receives the requested data (#709).

On the terminal apparatus 2, when the user agent data transmission unit 203 receives a request for the user agent data 5E from the image forming apparatus 1 (#737), the user agent data transmission unit 203 transmits the requested data (#738). The user agent data 5E indicates the product name and the version of the web browser of the terminal apparatus 2, an IP address of the terminal apparatus 2, together with resolution and pixel density of the touch panel display 20*e*. The unit of pixel density is "PPI" representing "pixel per inch".

In a case where no remote access is being executed, the display mode remains to be the normal mode. In this case, the user agent data 5E are not obtained.

On the image forming apparatus 1, the web page data acquisition unit 124 obtains a web page file from the web server 3 in a manner described below.

The web page data acquisition unit 124 issues a request for a web page to the web server 3 (#710 in FIG. 6) according to the URL. Specifically, in a case where, immediately after the start of the web browser program 1P2, there is a web page set as a homepage, the web page data acquisition unit 124 issues a request for this web page, to the web server 3. In another case where there is no web page set as a homepage, the web page data acquisition unit 124 issues a request, to the web server 3, for a web page specified with URL, or the like, later by the user by operating the terminal apparatus 2. Although not illustrated in the sequence diagrams in FIGS. 5 to 7, data indicating operation details are transmitted, as the operation data 5A, from the terminal apparatus 2 to the image forming apparatus 1 and request for this web page is issued to the web server 3.

A web page request is issued with a known method. For example, the web page data acquisition unit 124 transmits a hypertext transfer protocol (HTTP) request to the web server 3. The HTTP request indicates a web page address, a user agent of the client, or the like. In a case where the user agent data 5E has been obtained by the user agent data acquisition unit 123, the web page data acquisition unit 124 writes the user agent indicated on the user agent data 5E, into the HTTP request. With this operation, a portion or whole of the user agent data 5E would be transmitted to the web server 3. In a case where the user agent data 5E has not been obtained by the user agent data acquisition unit 123, the web page data acquisition unit 124 writes the user agent of the image forming apparatus 1 itself, into the HTTP request.

When the web server 3 receives the HTTP request (#751), the web server 3 issues a request (#752) toward the request-originating side for other information that is not indicated in the HTTP request, and obtains the information (#753), as required.

The web page data acquisition unit 124 receives the request (#711), and then, returns attribute data 5F indicating requested information, to the web server 3 in the following manner (#712). In a case where the user agent data 5E has been obtained by the user agent data acquisition unit 123, the web page data acquisition unit 124 transmits data indicating information indicated on the user agent data 5E to the web server 3, as the attribute data 5F. In other cases, the web page data acquisition unit 124 transmits data indicating the attribute of the image forming apparatus 1, as the attribute data 5F.

By steps #710 to #712 and steps #751 to #753, information, particularly on the web page address, and on display resolution, is issued for notification from the image forming apparatus 1 to the web server 3. Hereinafter, the resolution notified from the image forming apparatus 1 will be referred to as "resolution Ra".

Subsequently, the web server 3 transmits a file 5G of the web page according to the HTTP request to the image forming apparatus 1 (#754) in the following manner, and then, the web page data acquisition unit 124 of the image forming apparatus 1 receives the file 5G (#713).

When the web server 3 receives a request for a web page for managing data stored in a cloud storage, for example, the web server 3 transmits a file for displaying a large-sized web page 62 illustrated in FIG. 9, as the file 5G, in a case where the resolution Ra is predetermined resolution Rb (for example, 600×480 pixel) or more. In contrast, in a case where the resolution Ra is below the predetermined resolution Rb, the web server 3 transmits a file for displaying the small-sized web page 63 as illustrated in FIG. 10, as the file 5G.

The large-sized web page 62 is designed to match the resolution of the display of a personal computer or a tablet computer, and the small-sized web page 63 is designed to match the resolution of the display of a smartphone. Accordingly, there are more objects arranged on the large-sized web page 62 than the case of the small-sized web page 63.

With the above-described processing, in the normal mode or adjustment mode, the web page data acquisition unit 124 obtains a file of the large-sized web page 62, as the file 5G, from the web server 3. In the remote access mode, the web page data acquisition unit 124 obtains a file of the small-sized web page 63, as the file 5G.

When the file 5G has been obtained by the web page data acquisition unit 124 on the image forming apparatus 1 and in a case where the display mode is the adjustment mode, web page adjustment processing is executed by the web page adjustment unit 125 (#714). This processing will be described with an exemplary case of adjusting the web page 64 in FIG. 11A.

The web page adjustment unit 125 rewrites the file 5G so as to enlarge the web page 64. Magnification of enlargement may be preset or may be set to (Db/Da) times. where, "Da" represents the pixel density of the touch panel display 10e of the image forming apparatus 1, and "Db" represents the pixel density of the touch panel display 20e of the terminal apparatus 2.

For example, in a case where (Da/Db) is "4", the web page adjustment unit 125 rewrites the file 5G such that the web page 64 is vertically and horizontally enlarged four times, as illustrated in FIG. 11B. Hereinafter, the enlarged web page 64 will be referred to as a "web page 65".

Alternatively, it is allowable to enlarge the web page 64 according to individual resolution of the touch panel display 10e and the touch panel display 20e. For example, in a case where the resolution of the touch panel display 10e is (Wa×Ha) and the resolution of the touch panel display 20e is (Wb×Hb), it is allowable to vertically and horizontally enlarge a button 641 (Wa/Wb) times. Alternatively, it is allowable to enlarge the size (Ha/Hb) times. Still alternatively, it is allowable to vertically enlarge the size (Wa/Wb) times, and horizontally enlarge the size (Ha/Hb) times.

Returning to FIG. 6, the screen data generation unit 102 generates the screen data 5B in the following manner (#715).

In a case where the display mode is the remote access mode, the screen data generation unit 102 generates bitmap data by rendering the web page on a basis of the file 5G obtained by the web page data acquisition unit 124. In a case where the display mode is the adjustment mode, the screen data generation unit 102 generates bitmap data by rendering the web page on a basis of the file 5G rewritten by the web page adjustment unit 125. The data generated in this manner are the screen data 5B.

Subsequently, the screen data transmission unit 103 transmits the screen data 5B to the terminal apparatus 2 (#716).

On the terminal apparatus 2, the display processing unit 202 receives the screen data 5B (#739), and then, displays the web page on the touch panel display 20e (#740) on the basis of the screen data 5B.

At this time, in a case where the display mode is the remote access mode, a web page for the smartphone, such as the small-sized web page 63 (refer to FIG. 10) is displayed on the touch panel display 20e.

In contrast, in a case where the display mode is the adjustment mode, an enlarged web page, such as the web page 65 (refer to FIG. 11B), is displayed on the touch panel display 20e. Since it is enlarged, merely a portion of the web page might be displayed at a time in some cases, as illustrated in FIG. 11C. In this case, the user can display the remaining portions by scrolling the web page 65 with drag or flick operation.

Thereafter, each time the user specifies a web page by selecting a hyperlink, or with other methods, data for the operation details are transmitted as the operation data 5A from the terminal apparatus 2 to the image forming apparatus 1. Subsequently, the selected web page is requested from the image forming apparatus 1 to the web server 3, a web page corresponding to the current display mode (one of the remote access mode and the adjustment mode) is provided to the terminal apparatus 2.

When finishing the remote access, the user inputs a disconnect instruction into the terminal apparatus 2. When the terminal apparatus 2 receives the instruction (#741), the image forming apparatus 1 and the terminal apparatus 2 disconnect (#717 and #742) connection (remote connection) established in steps #702 and #732.

In response to this, the mode switching unit 122 switches, on the image forming apparatus 1, the display mode to the normal mode (#718).

After disconnection, remote operation toward the image forming apparatus 1 by the terminal apparatus 2 is finished, and then, the touch panel display 10e is unlocked (#719 in FIG. 7).

The web page data acquisition unit 124 issues a request for the web page being displayed on the terminal apparatus 2 immediately before disconnection, to the web server 3 (#720). Thereafter, the web page data acquisition unit 124 and the web server 3 execute processing (#722 to #724, and #755 to #758) similar to steps #711 to #713 and steps #751 to #754, respectively.

Note that the image forming apparatus 1 issues a notification of resolution of the touch panel display 10e of the image forming apparatus 1 itself, instead of the resolution of the touch panel display 20e of the terminal apparatus 2, to the web server 3. In response to this, the web server 3 transmits, to the image forming apparatus 1, a web page file for a personal computer, such as the large-sized web page 62 (refer to FIG. 9) instead of the web page file for a smartphone, such as the small-sized web page 63 (refer to FIG. 10).

Then, when the web page data acquisition unit 124 receives the web page file (#723) on the terminal apparatus 2, the web page display unit 126 displays the received web page on the touch panel display 10e as usual according to the file (#724).

Figure 12:
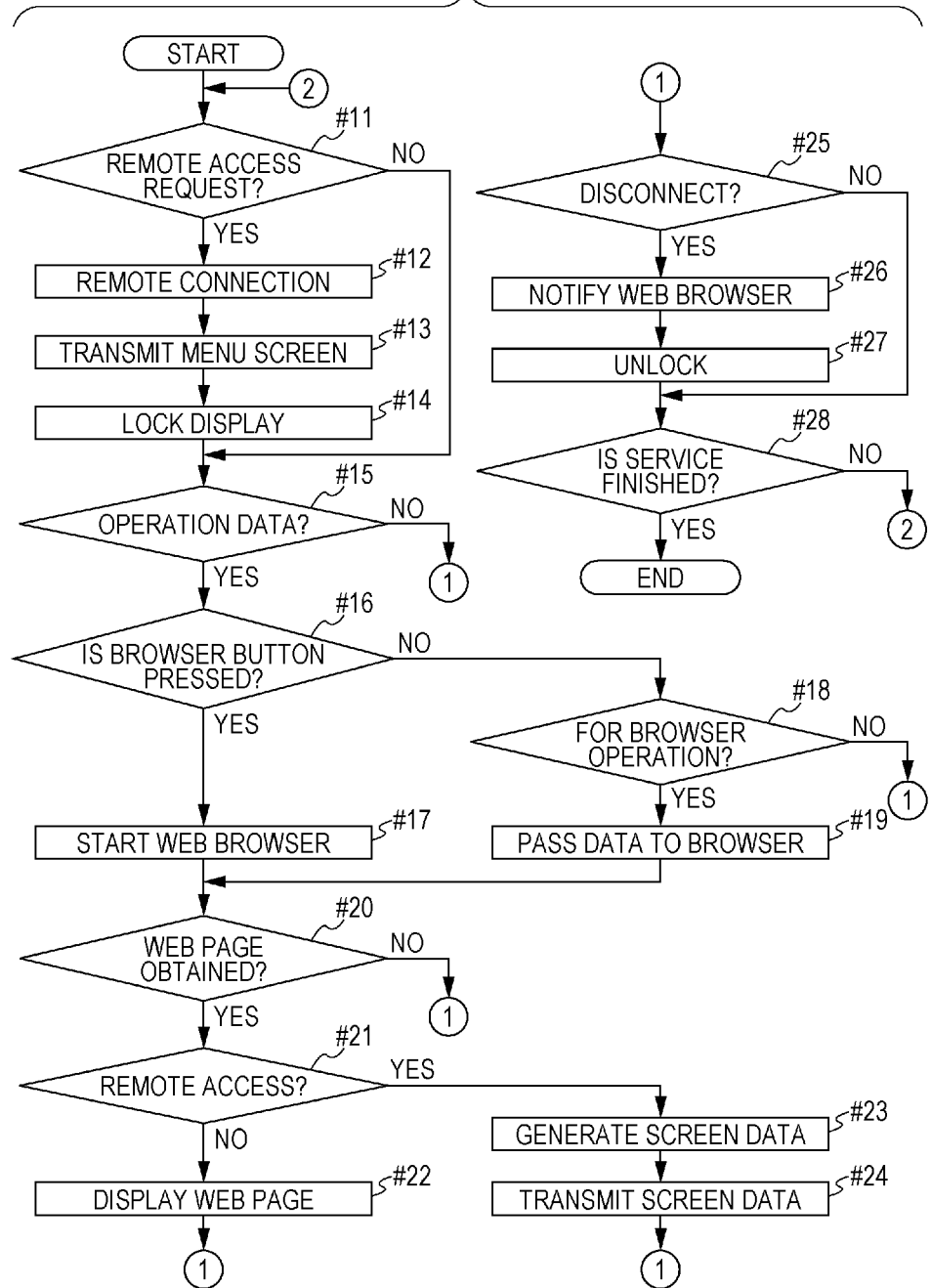
FIG. 12 is a flowchart illustrating an exemplary processing flow based on a server program.
Figure 13:
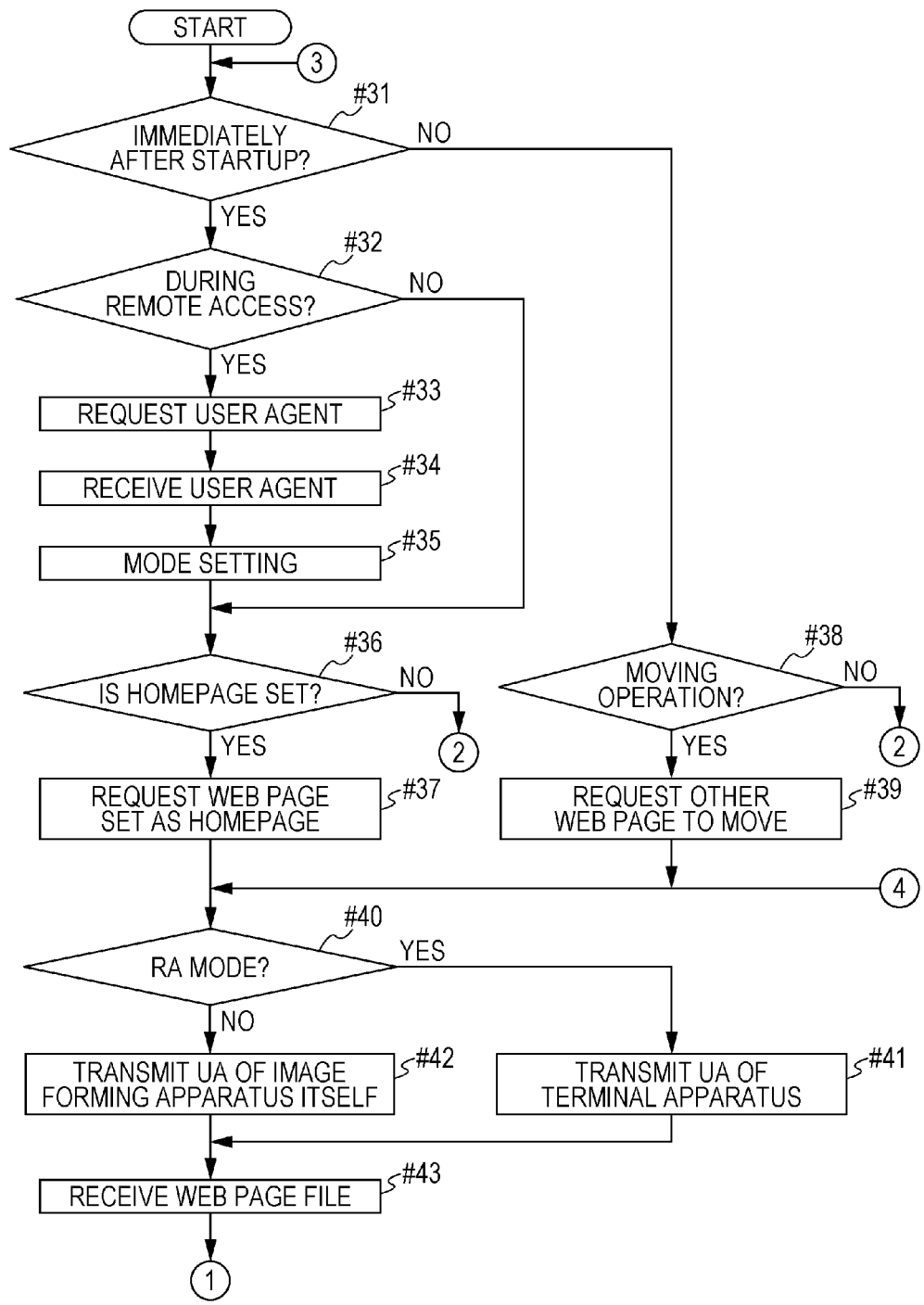
FIG. 13 is a flowchart illustrating an exemplary processing flow based on a web browser program.
Figure 14:
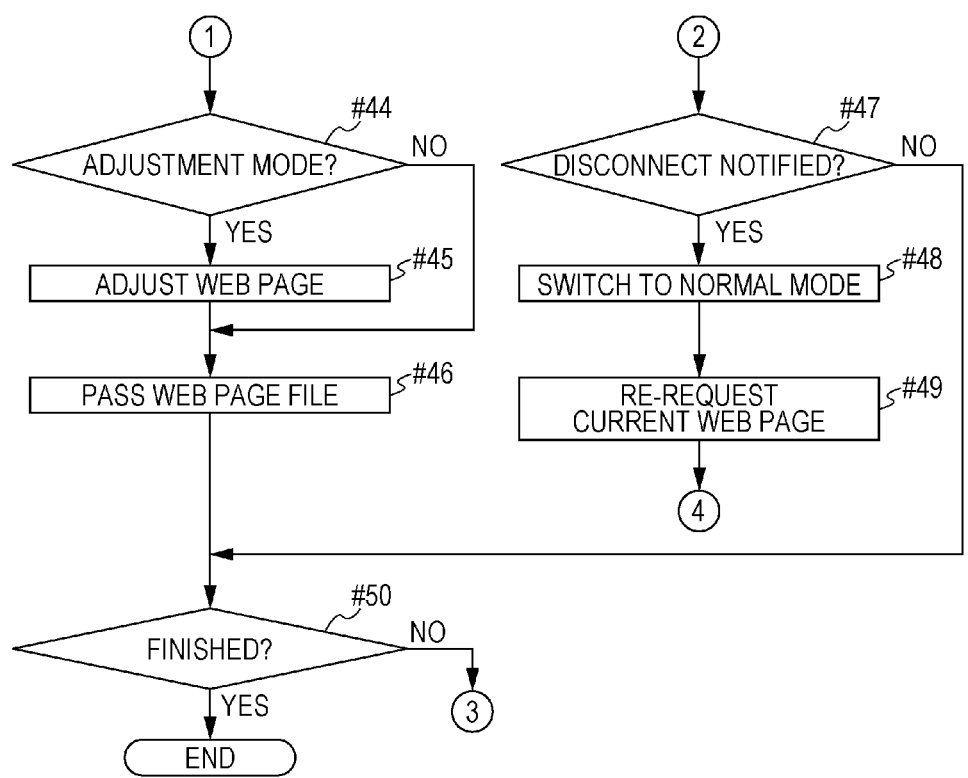
FIG. 14 is a flowchart illustrating an exemplary processing flow based on a web browser program.

FIG. 12 is a flowchart illustrating an exemplary processing flow based on the server program 1P1. FIGS. 13 to 14 are flowcharts illustrating exemplary processing flows based on the web browser program 1P2.

Next, an overall processing flow of the image forming apparatus 1 will be described with reference to the flowchart.

As illustrated in FIG. 12, the image forming apparatus 1 executes processing of providing a remote access service to the terminal apparatus 2 on a basis of the server program 1P1.

After receiving request for remote access from the terminal apparatus 2 (#11: Yes), the image forming apparatus 1 establishes connection with the terminal apparatus 2 (#12). Subsequently, the image forming apparatus 1 transmits data for displaying the menu screen 61 (refer to FIG. 8) as the screen data 5B, to the terminal apparatus 2 (#13), and together with this, locks the touch panel display 10e (#14).

Connected with the terminal apparatus 2, the image forming apparatus 1 receives the operation data 5A from the terminal apparatus 2 (#15: Yes), and executes the processing in the following manner according to the information indicated by the operation data 5A.

In a case where the operation data 5A indicates the pressing of the button 611 that starts the web browser (#16: Yes), the image forming apparatus 1 starts the web browser program 1P2 (#17). The image forming apparatus 1 subsequently executes the web browser program 1P2 in parallel with the server program 1P1. The processing flow executed by the web browser program 1P2 will be described below with reference to FIGS. 13 to 14.

Alternatively, in a case where information displayed as the operation data 5A is related to operation of the web browser (#18: Yes), the operation data 5A is passed to the web browser program 1P2 (#19).

In a case where the file 5G of the web page is obtained by the web browser program 1P2 (#20: Yes) after processing of step #17 or step #19, and when remote access is not being executed by the terminal apparatus 2 (#21: No), this web page is displayed by the touch panel display 10e on a basis of the file 5G (#22). In contrast, when remote access is being executed by the terminal apparatus 2 (#21: Yes), bitmap data of this web page is generated on a basis of the file 5G (#23), and the data is transmitted as the screen data 5B to the terminal apparatus 2 (#24).

In a case where connection established in step #12 is disconnected (#25: Yes), the image forming apparatus 1 issues a notification of disconnection to the web browser program 1P2 (#26), and together with this, unlocks the touch panel display 10e (#27).

While providing remote access service, the image forming apparatus 1 appropriately executes processing of steps #11 to #26.

Moreover, the image forming apparatus 1 executes processing in the following manner with a method illustrated in FIGS. 13 to 14 on the basis of the web browser program 1P2.

After starting of the web browser program 1P2 (#31: Yes), in a case where the image forming apparatus 1 is remotely accessed by the terminal apparatus 2 (#32: Yes), the image forming apparatus 1 issues a request for the user agent data 5E, to the terminal apparatus 2 (#33), and receives the requested data (#34). Then, the image forming apparatus 1 switches the display mode to one of the remote access mode and the adjustment mode (#35).

In a case where a homepage is set on the web browser program 1P2 (#36: Yes), the image forming apparatus 1 issues a request for the web page as the homepage, to the web server 3 (#37).

The image forming apparatus 1 transmits a user agent, or the like, to the web server 3 at the time of issuance of the request for the web page, or in response to the request from the web server 3 (#40 to #42). Specifically, in a case where the display mode is the remote access mode (#40: Yes), the image forming apparatus 1 transmits (#41) a user agent (at least resolution of the touch panel display 20e in the present embodiment) of the terminal apparatus 2, received in step #34. In a case where the display mode is not the remote access mode (#40: No), the image forming apparatus 1 transmits (#42) a user agent of itself (at least resolution of the touch panel display 10e in the present embodiment).

The image forming apparatus 1 receives the file 5G of the requested web page, from the web server 3 (#43).

In a case where the display mode is the adjustment mode (#44: Yes in FIG. 14), the image forming apparatus 1 rewrites the received file 5G (#45) to adjust the web page. Exemplary adjustment methods are as described in FIGS. 11A to 11C.

The file 5G is rewritten as required and thereafter is used by the server program 1P1 so as to display the web page onto the touch panel display 10e, or onto the touch panel display 20e of the terminal apparatus 2 (#46). The usage is as described in steps #21 to #24 in FIG. 12.

Processing in steps #32 to #34 is executed merely once after the start of the web browser program 1P2. Automatic access to a homepage (#37 to 46) is fundamentally executed merely once after the start of the web browser program 1P2.

Alternatively, when the operation data 5A is given from the server program 1P1, and in a case where operation to move from a current web page (or, a blank page) to other web page is indicated in the operation data 5A (#38: Yes), the image forming apparatus 1 issues a request for the other web page, to the web server 3 (#39). Thereafter, processing is similar to the processing in accessing to the homepage (#40 to #46).

Alternatively, when disconnection of the connection is notified from the server program 1P1 (#47: Yes), the image forming apparatus 1 switches the display mode to the normal mode (#48). Subsequently, the image forming apparatus 1 issues a request for the web page being displayed by the touch panel display 20e of the terminal apparatus 2 immediately before disconnection of the connection, to the web server 3 (#49). Thereafter, processing is similar to the processing in accessing to the homepage (#40 to #46). As a result, the web page is displayed on the touch panel display 10e of the image forming apparatus 1 itself, as usual.

Processing in steps #38 to #49 is appropriately executed until the web browser program 1P2 is finished.

According to the present embodiment, it is possible to provide web content more suitably than before to the terminal apparatus 2 in a case where the terminal apparatus 2 remotely accesses the image forming apparatus 1 to use the web browser of the image forming apparatus 1.

In the present embodiment, the server program 1P1 and the web browser program 1P2 are configured as independent programs. It is, however, allowable to configure them as one program.

In the present embodiment, the image forming apparatus 1 issues a notification of display resolution to the web server 3, and the web server 3 provides the file 5G of the web page corresponding to the resolution. Alternatively, however, it is also allowable to configure such that the image forming apparatus 1 issues a notification of another attribute and the web server 3 provides the file 5G of the web page corresponding to that attribute.

For example, the image forming apparatus 1 issues a notification of the name of the operating system (OS) of the terminal apparatus 2 in a case where the mode is the remote access mode, and issues a notification of the name of the OS of the image forming apparatus 1 itself in cases where the mode is other than the remote access mode. The web server 3 determines whether the OS is for a smartphone on a basis of the notified name of the OS. In a case where the OS is for a smartphone, the web server 3 transmits the file 5G of a web page for a smartphone (for example, the small-sized web page 63 in FIG. 10). In a case where the OS is not for smartphones, the web server 3 transmits the file 5G for a web page for a personal computer (for example, the large-sized web page 62 in FIG. 9).

Alternatively, the image forming apparatus 1 issues a notification of the size (inch) of the touch panel display 20e of the terminal apparatus 2 in a case where the mode is the remote access mode, and issues a notification of the size of the touch panel display 10e of the image forming apparatus 1 itself in cases where the mode is other than the remote access mode. In a case where the size is below a predetermined size, the web server 3 transmits the file 5G of a web page for a smartphone. In a case where the size is the predetermined size or above, the web server 3 transmits the file 5G for a web page for a personal computer.

In the present embodiment, the web page adjustment unit 125 executes web page adjustment processing in the adjustment mode alone. It is, however, allowable to configure such that the web page adjustment unit 125 executes the processing in a case where remote access is being executed and resolution of the touch panel display 20e of the terminal apparatus 2 is below predetermined resolution (for example, resolution of the touch panel display 10e).

In the present embodiment, the touch panel display 10e of the image forming apparatus 1 is locked during a period of remote access by the terminal apparatus 2 to the image forming apparatus 1. Alternatively, the touch panel display 10e need not be locked. In this case, it would be appropriate to display the web page also on the touch panel display 10e.

In the present embodiment, the web server 3 distributes a web page, as web content, to the image forming apparatus 1. The present invention is also applicable to the case where a moving image, or the like, is distributed as web content.

Other than the above, it is possible to appropriately modify a configuration, processed content, processing order, screen configuration, or the like, of overall portions or an individual portion of the web page browsing system 100, the image forming apparatus 1, and the terminal apparatus 2, according to the scope of the present invention.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming apparatus that can be remotely accessed from a terminal apparatus, the image forming apparatus comprising:
   a display;
   a controller that executes a program to function as:
   a display control unit configured to control display of the display and to transmit image data of an image to the terminal apparatus in order to display the image to be displayed on the display, onto the terminal apparatus;
   an attribute information acquisition unit configured to obtain first attribute information related to an attribute of the terminal apparatus;
   a web content acquisition unit configured to obtain web content by issuing a notification of second attribute information related to an attribute of the image forming apparatus to a server in a case where remote access is not being executed from the terminal apparatus, and by issuing a notification of the first attribute information to the server in a case where remote access is being executed from the terminal apparatus; and
   a browser unit configured to generate an image based on the obtained web content,
   wherein the display control unit
   displays, on the display, an image based on the web content that corresponds to the second attribute information, generated by the browser unit, in a case where remote access is not being executed from the terminal apparatus, and
   transmits, to the terminal apparatus, the image data of an image based on the web content that corresponds to the first attribute information, generated by the browser unit, in a case where remote access is being executed from the terminal apparatus.

2. The image forming apparatus according to claim 1, wherein the first attribute information is information related to a second display included in the terminal apparatus, and
the second attribute information is information related to the display.

3. The image forming apparatus according to claim 2, wherein the first attribute information is resolution of the second display and the second attribute information is resolution of the display.

4. The image forming apparatus according to claim 1, wherein, in a case remote access from the terminal apparatus is discontinued, the web content acquisition unit obtains web content displayed on the terminal apparatus immediately before the discontinuation, as the web content, by issuing a notification of the first attribute information to the server.

5. A web content display system comprising:
the image forming apparatus according to claim 1; and
a server configured to provide web content to the image forming apparatus,
wherein the server includes a web content transmission unit configured to transmit, to the image forming apparatus, web content that corresponds to one of the first attribute information and the second attribute information, notified from the image forming apparatus, as the web content.

6. An image forming apparatus that can be remotely accessed from a terminal apparatus, the image forming apparatus comprising:
   a display;
   a controller that executes a program to function as:
   a display control unit configured to control display of the display and to transmit image data of an image to the terminal apparatus in order to display the image to be displayed on the display, onto the terminal apparatus;
   an attribute information acquisition unit configured to obtain first attribute information related to an attribute of the terminal apparatus;
   a web content acquisition unit configured to obtain web content from a server by issuing a notification of second attribute information related to an attribute of the image forming apparatus to a server; and a browser unit configured to generate an image based on the obtained web content, wherein the display control unit displays, on the display, the image based on the web content that corresponds to the second attribute information, generated by the browser unit, in a case where remote access is not being executed from the terminal apparatus, and transmits, to the terminal apparatus, the image data of the obtained web content that have been adjusted on a basis of the first attribute information, in a case where remote access is being executed from the terminal apparatus.

7. The image forming apparatus according claim 6, wherein the first attribute information is first pixel density of a display of the terminal apparatus, the second attribute information is second pixel density of the display, and the browser unit generates an image based on the web content that corresponds to the first attribute information by enlarging the image based on the web content that corresponds to the second attribute information according to a ratio of the first pixel density to the second pixel density.

8. A web page providing method on an image forming apparatus that includes a display and can be remotely accessed from a terminal apparatus, the method comprising causing the image forming apparatus to execute:

first processing of obtaining first attribute information related to an attribute of the terminal apparatus;

second processing of obtaining web content by issuing, to the server, a notification of second attribute information related to an attribute of the image forming apparatus in a case where remote access is not being executed from the terminal apparatus, and by issuing, to the server, a notification of the first attribute information in a case where remote access is being executed from the terminal apparatus; and third processing of generating an image based on the web content that corresponds to the second attribute information and displaying the generated image on the display in a case where remote access is not being executed from terminal apparatus, and generating the image data of an image based on the web content that corresponds to the first attribute information and transmitting the generated image data to the terminal apparatus in a case where remote access is being executed from the terminal apparatus.

9. The web page providing method according to claim 8, wherein the first attribute information is information related to a second display included in the terminal apparatus, and the second attribute information is information related to the display.

10. The web page providing method according to claim 9, wherein the first attribute information is resolution of the second display and the second attribute information is resolution of the display.

11. The web page providing method according to claim 8, wherein, in a case where remote access from the terminal apparatus is discontinued, the web content acquisition unit obtains web content displayed on the terminal apparatus immediately before the discontinuation, as the web content, by issuing a notification of the first attribute information to the server.

12. A non-transitory computer-readable recording medium encoded with a web page providing program, the web page providing program causing a computer controlling the image forming apparatus to perform the web page providing method of claim 8.

13. The non-transitory computer-readable recording medium encoded with a web page providing program according to claim 12, wherein the first attribute information is information related to a second display included in the terminal apparatus, and the second attribute information is information related to the display.

14. The non-transitory computer-readable recording medium encoded with a web page providing program according to claim 13, wherein the first attribute information is resolution of the second display, and the second attribute information is resolution of the display.

15. The non-transitory computer-readable recording medium encoded with a web page providing program according to claim 12, wherein in a case remote access from the terminal apparatus is discontinued, the second processing obtains web content displayed on the terminal apparatus immediately before the discontinuation, as the web content, by issuing a notification of the first attribute information to the server.

16. A non-transitory computer-readable recording medium encoded with a computer program used in an image forming apparatus that includes a display and can be remotely accessed from a terminal apparatus, the computer program causing the image forming apparatus to execute:

first processing of obtaining first attribute information related to an attribute of the terminal apparatus;

second processing of obtaining web content from a server by issuing, to the server, a notification of the second attribute information related to an attribute of the image forming apparatus;

third processing of generating an image based on the obtained web content; and fourth processing of displaying, onto the display, an image based on the web content that corresponds to the second attribute information, generated by the third processing in a case where remote access is not being executed from the terminal apparatus, and transmitting, to the terminal apparatus, the image data of the obtained web content that have been adjusted on a basis of the first attribute information, in a case where remote access is being executed from the terminal apparatus.

17. The non-transitory computer-readable recording medium encoded with a computer program according to claim 16, wherein the first attribute information is first pixel density of a display of the terminal apparatus, the second attribute information is second pixel density of the display, and the third processing generates an image based on the web content that corresponds to the first attribute information by enlarging the image based on the web content that corresponds to the second attribute information according to a ratio of the first pixel density to the second pixel density.

* * * * *